(12) United States Patent
Najaryan et al.

(10) Patent No.: US 11,755,453 B1
(45) Date of Patent: Sep. 12, 2023

(54) PERFORMING ITERATIVE ENTITY DISCOVERY AND INSTRUMENTATION

(71) Applicant: SPLUNK Inc., San Francisco, CA (US)

(72) Inventors: Tigran Najaryan, Maple (CA); Aunsh Bharat Chaudhari, Santa Clara, CA (US); Morgan James McLean, Vancouver (CA); Yiqing Pei, Denver, CO (US)

(73) Assignee: SPLUNK Inc., San Francisco, CA (US)

( * ) Notice: Subject to any disclaimer, the term of this patent is extended or adjusted under 35 U.S.C. 154(b) by 0 days.

(21) Appl. No.: 17/973,394

(22) Filed: Oct. 25, 2022

(51) Int. Cl.
  *G06F 9/44* (2018.01)
  *G06F 11/34* (2006.01)
(52) U.S. Cl.
  CPC ................ *G06F 11/3495* (2013.01)
(58) Field of Classification Search
  CPC .................................................. G06F 11/3495
  USPC ............................................................. 719/320
  See application file for complete search history.

(56) References Cited

U.S. PATENT DOCUMENTS

| | | | |
|---|---|---|---|
| 7,937,344 | B2 | 5/2011 | Baum et al. |
| 8,112,425 | B2 | 2/2012 | Baum et al. |
| 8,751,529 | B2 | 6/2014 | Zhang et al. |
| 8,788,525 | B2 | 7/2014 | Neels et al. |
| 9,215,240 | B2 | 12/2015 | Merza et al. |
| 9,286,413 | B1 | 3/2016 | Coates et al. |
| 10,127,258 | B2 | 11/2018 | Lamas et al. |
| 2006/0218533 | A1* | 9/2006 | Koduru ............... G06F 11/3447 717/124 |
| 2017/0041296 | A1* | 2/2017 | Ford ....................... G06F 21/64 |
| 2018/0121329 | A1* | 5/2018 | Lo ......................... G06F 11/323 |
| 2019/0098106 | A1 | 3/2019 | Mungel et al. |

OTHER PUBLICATIONS

Splunk Enterprise 8.0.0 Overview, available online, retrieved May 20, 2020 from docs.splunk.com.
Splunk Cloud 8.0.2004 User Manual, available online, retrieved May 20, 2020 from docs.splunk.com.
(Continued)

*Primary Examiner* — Timothy A Mudrick
(74) *Attorney, Agent, or Firm* — KILPATRICK TOWNSEND & STOCKTON LLP

(57) ABSTRACT

In response to receiving a selection of an option to discover uninstrumented entities within a monitored environment, information retrieved from monitoring agents currently installed on instrumented entities within a system is analyzed to discover additional entities within the system that are connected to the instrumented entities. Each of these discovered entities is analyzed to determine whether a monitoring agent is able to be installed within the entity; if installation is possible, such installation is automatically performed (or a guided manual installation is implemented utilizing an interface). After a monitoring agent is installed within a discovered entity, information is retrieved from that monitoring agent may be used to discover additional entities within the system that are connected to that discovered entity. In this way, an iterative discovery of all entities within a system may be performed. Results of this iterative discovery may be presented via an interface.

20 Claims, 9 Drawing Sheets

(56) References Cited

OTHER PUBLICATIONS

Splunk Quick Reference Guide, updated 2019, available online at https://www.splunk.com/pdfs/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

PERFORMING ITERATIVE ENTITY DISCOVERY AND INSTRUMENTATION

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

Instrumenting data systems so that passively and actively generated data can be gathered from such systems is an important task. Planning and implementing such instrumentation presents numerous technical challenges.

BRIEF DESCRIPTION OF THE DRAWINGS

Illustrative examples are described in detail below with reference to the following figures.

DETAILED DESCRIPTION

Figure 1:
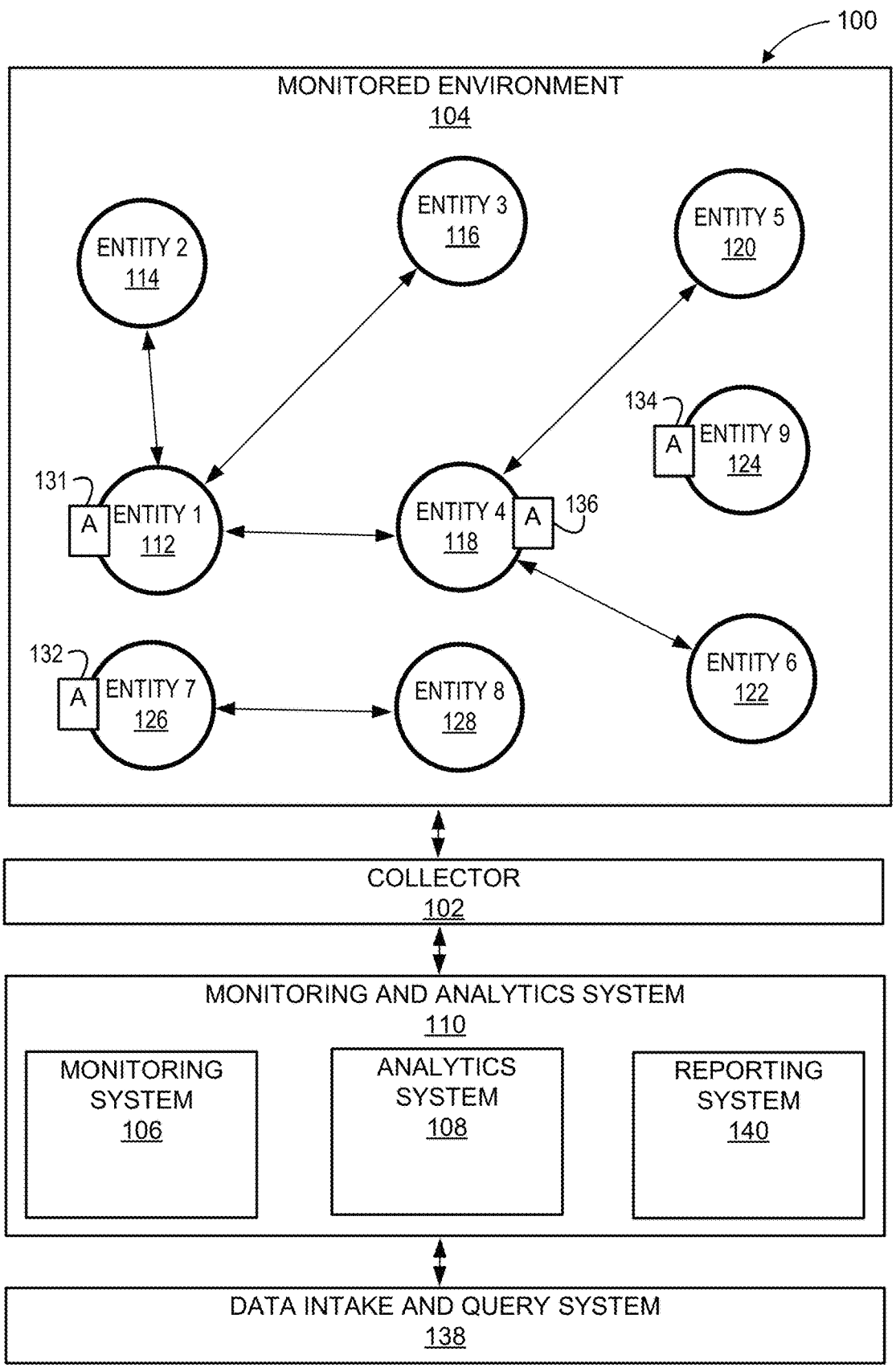
FIG. 1 is a block diagram of a data collection and analysis environment, according to at least one implementation.

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that concurrently report these types of information.

These challenges can be addressed by using an event-based data intake and query system, such as the SPLUNK® ENTERPRISE, SPLUNK® CLOUD, or SPLUNK® CLOUD SERVICE system developed by Splunk Inc. of San Francisco, Calif. These systems represent the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, metrics data, tracing data, and other data input sources.

In the data intake and query system, machine data is collected and stored as "events." An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp. The time stamp may be derived from the portion of machine data in the event, determined through interpolation between temporally proximate events having known timestamps, and/or may be determined based on other configurable rules for associating timestamps with events.

In some instances, machine data can have a predefined structure, where data items with specific data formats are stored at predefined locations in the data. For example, the machine data may include data associated with fields in a database table. In other instances, machine data may not have a predefined structure (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system can use flexible schema to specify how to extract information from events. A flexible schema may be developed and redefined as needed. The flexible schema can be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp, and stores the events. The system enables users to run queries against the stored events to, for example, retrieve events that meet filter criteria specified in a query, such as criteria indicating certain keywords or having specific values in defined fields. Additional query terms can further process the event data, such as, by transforming the data, etc.

As used herein, the term "field" can refer to a location in the machine data of an event containing one or more values for a specific data item. A field may be referenced by a field name associated with the field. As will be described in more detail herein, in some cases, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file can include one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source-type. When events are to be searched based on a particular field name specified in a search, the system can use one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system can utilize a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from machine data or events. In some cases, an extraction rule comprises a regular expression, where a sequence of characters form a search pattern. An extraction rule comprising a regular expression is referred to herein as a regex rule. The system applies a regex rule to machine data or an event to extract values for a field associated with the regex rule, where the values are extracted by searching the machine data/event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some implementations, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources.

In some implementations, the configuration files and/or extraction rules described above can be stored in a catalog, such as a metadata catalog. In certain implementations, the content of the extraction rules can be stored as rules or actions in the metadata catalog. For example, the identification of the data to which the extraction rule applies can be referred to as a rule and the processing of the data can be referred to as an action.

Within a computing environment, machine data may be retrieved from various components (also known as entities) utilizing instrumentation functionality—specifically, monitoring agents installed within such entities may retrieve the machine data. A monitoring agent for an entity may identify data received and sent by the entity and may track performance metrics and other information generated by the entity. The monitoring agent may compile this monitored information and send the information to a monitoring system for review, analysis, and reporting.

Entities within a computing environment are diverse, and different monitoring agents with different installation requirements may be needed for different entities within such an environment. There may also be entities within a computing environment for which no monitoring agents are available. Identifying uninstrumented entities (entities without an installed monitoring agent) within a computing environment and instrumenting such entities (by installing monitoring agents on such entities), is a daunting task, especially since many environments commonly include a large number of such entities that makes manual instrumentation impossible.

To address this, information retrieved from monitoring agents currently installed on instrumented entities within a system is analyzed to discover additional entities within the system that are connected to the instrumented entities. Each of these discovered entities is analyzed to determine whether a monitoring agent is able to be installed within the entity; if installation is possible and permission to instrument the entity is provided, such installation is automatically performed (or a guided manual installation is implemented utilizing an interface). In another example, a list of all known entities within a system may be retrieved (e.g., from a cloud provider, etc.) and may be compared to a list of known entities with installed agents to discover entities which do not have a corresponding agent installed. Each of these discovered entities is analyzed to determine whether a monitoring agent is able to be installed within the entity; if installation is possible and permission to instrument the entity is provided, such installation is automatically performed (or a guided manual installation is implemented utilizing an interface). After a monitoring agent is installed within a discovered entity, information is retrieved from that monitoring agent and is used to discover additional entities within the system that are connected to that discovered entity. In this way, an iterative discovery of all entities within a system may be performed.

FIG. 1 illustrates a data collection and analysis environment 100, according to one implementation. As shown, a monitored environment 104 includes a plurality of entities 112-128. The plurality of entities 112-128 may include one or more applications and/or services (such as compute services, networking services, storage services, operating systems, etc.). In another implementation, the plurality of entities 112-128 may include one or more physical computing devices, one or more virtual computing devices (such as virtual machines, containers, etc.), one or more networking devices (such as routers, etc.), etc. In yet another implementation, the plurality of entities 112-128 may include entities within a distributed system that are associated with one or more clients. For example, the plurality of entities 112-128 may include one or more cloud-based services that are subscribed to by a client. In another example, each client may include a tenant of a cloud computing service that provides on demand services, a customer of a client data center, etc.

Additionally, a subset of the entities 112-128 are instrumented in that such subset of entities (including a first entity 112, a fourth entity 118, a seventh entity 126, and a ninth entity 124) each includes an installed monitoring agent 130-136. The remaining entities (including the second entity 114, third entity 116, fifth entity 120, sixth entity 122, and eighth entity 128) are uninstrumented in that such entities do not include an installed monitoring agent. One or more of the uninstrumented entities may include one or more third-party services subscribed to by a client.

In one implementation, the monitoring agents 130-136 may each be installed within their corresponding entity within the monitored environment 104. For example, a client may install a first monitoring agent 130 (such as a tracing application) on a first entity 112 within the monitored environment 104. In another example, the client may provide login information (such as a username and password) to the monitoring and analytics system 110, and the monitoring and analytics system 110 may automatically detect the fourth entity 118 and may automatically install the second monitoring agent 136 within the fourth entity 118. In another implementation, the monitoring agents 130-136 may be implemented utilizing open source or commercial tracing libraries, tracing applications (e.g., Jaeger, Zipkin, etc.), in-house formatting, auto-instrumentation, etc. In one example, one or more of the monitoring agents 130-136 may include the same software. In another example, one or more of the monitoring agents 130-136 may include different versions of the same software.

As shown, operational data generated by entities 112-128 within a monitored environment 104 is received at a monitoring and analytics system 110 via a collector 102. In one implementation, the monitoring agents 130-136 may identify and retrieve operational data from their corresponding entity and may provide such operational data to the collector 102. The monitoring agents 130-136 may provide the operational data as it is created, periodically, according to a predetermined schedule, etc. The monitoring agents 130-136 may perform additional operations such as batching, buffering, and updating instrumentation libraries, etc.

Also, in one implementation, the operational data may include any data received, sent, processed, created, etc. by an entity during the operation of such an entity. For example, the operational data may include requests sent by the entity to other entities, requests received at the entity from other entities, operations performed on data by the entity, data received at the entity from another entity, data sent by the entity to another entity, etc. In another implementation, the operational data may also include performance data for the entity. For example, the operational data may include a response time (e.g., a time taken by the entity to respond to a request), a processing time (e.g., a time taken by the entity to process data), memory usage (e.g., an amount of memory currently utilized by the entity), processor usage (e.g., an amount of processor resources utilized by the entity), network usage (e.g., an amount of bandwidth currently utilized by the entity), etc.

In one implementation, the operational data may include one or more spans. For example, a span may represent an individual unit of work done in a distributed system. The span may include additional information, such as a unique span ID, a service name (e.g., "analytics"), an operation name (e.g., "start"), duration (latency), start and end timestamps and additional annotations and attributes (e.g., tags). The annotations and attributes can describe and contextualize the work being done within a span. Tags may include key:value pairs that provide further context regarding an execution environment for the spans. These tags may enable a user-defined annotation of spans in order to query, filter and comprehend span data. Tag information (including the key and corresponding value) may be included with each span and there may be different levels of tag information included in a span.

Also, in one implementation, the one or more spans may be part of a larger trace within the distributed system. For example, a trace may include details of a transaction that propagates from one service to another within a distributed computing environment. This transaction may include an end-to-end request-response flow, starting with the sending of an initial request and ending with the receipt of a final response to such request. The trace may follow a course of a transaction from its source to its ultimate destination in a distributed computing environment. The trace may be conceptualized as a highly dimensional structured log that captures a full graph of user-generated and background request execution and which contains information about interactions as well as causality. A trace may include a plurality of spans, where each span may indicate an individual unit of work performed during a particular transaction.

Further, in one implementation, the monitoring agents 130-136 may identify and retrieve operational data, as well as metrics associated with such data, from one or more uninstrumented entities that are in communication with an instrumented entity in which the monitoring agents 130-136 are installed. For example, a first monitoring agent 130 installed within a first entity 112 may retrieve operational data from a second entity 114 that is uninstrumented but is in communication with the first entity 112. This operational data may include responses sent from the second entity 114 to the first entity 112, queries/requests sent from the second entity 114 to the first entity 112, etc.

For example, the first entity 112 may send a request to a second entity 114. The first entity 112 may then receive a response from the second entity 114. The first monitoring agent 130 installed within the first entity 112 may track an amount of time that has passed between the sending of the request and the receipt of the response. In this example, the request, the response, and the amount of time taken by the second entity 114 to respond may be included as operational data for the second entity 114 that is compiled by the first monitoring agent 130 and sent from the first monitoring agent 130 to the collector 102.

Further still, in one implementation, the collector 102 may include a system for collecting operational data from the monitoring agents 130-136 and relaying such operational data to a monitoring system 106 within the monitoring any analytics system 110. The collector 102 may include a cloud-based service, a standalone computing device, one or more local or remote applications, etc. For example, the collector 102 and the monitoring and analytics system 110 may be connected by one or more communication networks, and the collector 102 may send the operational data to the monitoring system 106 of the monitoring and analytics system 110 using one or more application programming interfaces (APIs).

In another implementation, the collector 102 may compile operational data over a predetermined period of time for one or more clients and may send the compiled operational data to the monitoring system 106 within the monitoring any analytics system 110. In yet another implementation, the collector 102 may perform one or more pre-processing actions on the received operational data before sending the operational data to the monitoring system 106. For example, before sending the operational data to the monitoring system 106, the collector 102 may discard duplicate operational data, may filter out predetermined data from the operational data, may group the operational data by client, etc.

In response to receiving the operational data from the collector 102, the monitoring system 106 within the monitoring and analytics system 110 sends the operational data to an analytics system 108, which performs one or more operations on the data. In one implementation, analyzing the operational data by the analytics system 108 may include performing one or more operations on the operational data (such as organizing the operational data into one or more buckets, generating statistical data on the operational data, etc.).

Also, in one implementation, results of such operations are then sent from the analytics system 108 to a reporting system 140. The results of the analysis may include one or more reports, one or more data structures, one or more summaries, etc. The reporting system 140 may be configured to generate one or more reports, graphical user interfaces (GUIs), and/or graphical visualizations to represent the results of the analysis. The reporting system 140 may, for example, generate a visualization, such as a histogram to represent information regarding the results of the analysis.

In this way, the monitoring and analytics system 110 may analyze and report on operational data retrieved from entities 112-128 within the monitored environment 104. This analysis and reporting may be provided as a service to multiple clients. For example, a client may subscribe to a service that retrieves operational data from one or more of the entities 112-128 associated with the client, analyzes such operational data, and presents reports of such analysis to the client. As a result, insights into the functionality and performance of the entities of the client may be determined and presented as a service to the client.

Also, operational data retrieved from entities 112-128 within the monitored environment 104 may be coupled with log or other data from a data intake and query system 138. In one implementation, the data intake and query system 138 may be included within the monitoring and analytics system 110. The operational data retrieved from entities 112-128 within the monitored environment 104 may be ingested into the data intake and query system 138, or may be coupled with outputs from the data intake and query system 138, e.g., from searches that may be based on trace data and run on the data intake and query system 138.

In one example, the data intake and query system 138 may be integrated with or into the monitoring and analytics system 110 that analyzes operational data. The monitoring and analytics system 110 may, accordingly, comprise a full suite of services including, for example, analyzing operational data, ingesting and analyzing log data, ingesting metrics data and providing insights generated from the metrics data, including aggregating and/or correlating trace data, log data and metrics data, in order to gain insights into a computing platform.

As described above, the operational data retrieved from entities 112-128 within the monitored environment 104 may be sent to systems configured to ingest and search data, such as the data intake and query system 138 described above. Additionally, other implementations may use a stream processor that can perform transformations and other operations on incoming data prior to, concurrently with, and/or as an alternative to, ingestion of the data. In some implementations, the system may also be configured to ingest metrics data and may be optimized to ingest, query and generate insights from metrics data.

In some implementations, the monitoring and analytics system 110 can include a gateway or other mechanism to interact with external devices or to facilitate communications between components of the monitoring and analytics system 110. In some implementations, the gateway can be implemented using an application programming interface (API). In certain implementations, the gateway can be implemented using a representational state transfer API (REST API).

In some environments, a user of a monitoring and analytics system 110 may install and configure, on computing devices owned and operated by the user, one or more software applications that implement some or all of the components of the monitoring and analytics system 110. For example, with reference to FIG. 1, a user may install a software application on server computers owned by the user and configure each server to operate as one or more components of the monitoring and analytics system 110. This arrangement generally may be referred to as an "on-premises" solution. That is, the monitoring and analytics system 110 can be installed and can operate on computing devices directly controlled by the user of the monitoring and analytics system 110. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of monitoring and analytics system 110 operate.

In certain implementations, one or more of the components of the monitoring and analytics system 110 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide a monitoring and analytics system 110 by managing computing resources configured to implement various aspects of the system (e.g., the monitoring system 106, the analytics system 108, the reporting system 140, other components, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the monitoring and analytics system 110 execute can be shared by multiple customers or tenants as part of the shared computing resource environment. In addition, when implemented in a shared computing resource environment as a cloud-based service, various components of the monitoring and analytics system 110 can be implemented using containerization or operating-system-level virtualization, or other virtualization technique. For example, one or more components of the monitoring system 106, the analytics system 108, the reporting system 140, etc. can be implemented as separate software containers or container instances. Each container instance can have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from memory space of other containers. Further, each container may run the same or different computer applications concurrently or separately and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the monitoring and analytics system 110 in a shared computing resource environment can provide a number of benefits. In some cases, implementing the monitoring and analytics system 110 in a shared computing resource environment can make it easier to install, maintain, and update the components of the monitoring and analytics system 110. For example, rather than accessing designated hardware at a particular location to install or provide a component of the monitoring and analytics system 110, a component can be remotely instantiated or updated as desired. Similarly, implementing the monitoring and analytics system 110 in a shared computing resource environment or as a cloud-based service can make it easier to meet dynamic demand. For example, if the monitoring and analytics system 110 experiences significant load at indexing or search, additional compute resources can be deployed to process the additional data or queries. In an "on-premises" environment, this type of flexibility and scalability may not be possible or feasible.

In addition, by implementing the monitoring and analytics system 110 in a shared computing resource environment or as a cloud-based service can improve compute resource utilization. For example, in an on-premises environment if the designated compute resources are not being used by, they may sit idle and unused. In a shared computing resource environment, if the compute resources for a particular component are not being used, they can be re-allocated to other tasks within the monitoring and analytics system 110 and/or to other systems unrelated to the monitoring and analytics system 110.

As mentioned, in an on-premises environment, data from one instance of a monitoring and analytics system 110 is logically and physically separated from the data of another instance of a monitoring and analytics system 110 by virtue of each instance having its own designated hardware. As such, data from different customers of the monitoring and analytics system 110 is logically and physically separated from each other. In a shared computing resource environment, components of a monitoring and analytics system 110 can be configured to process the data from one customer or tenant or from multiple customers or tenants. Even in cases where a separate component of a monitoring and analytics system 110 is used for each customer, the underlying hardware on which the components of the monitoring and analytics system 110 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the monitoring and analytics system 110 can maintain logical separation between tenant data. For example, the monitoring and analytics system 110 can include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customers A's hard drive and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the monitoring and analytics system 110 can maintain the mutual exclusivity and/or independence between tenant data even as the tenant data is being processed, stored, and searched by the same underlying hardware. In certain cases, to maintain the mutual exclusivity and/or independence between the data of different tenants, the monitoring and analytics system 110 can use tenant identifiers to uniquely identify data associated with different tenants.

In a shared computing resource environment, some components of the monitoring and analytics system 110 can be instantiated and designated for individual tenants and other components can be shared by multiple tenants. In certain implementations, the monitoring system 106, the analytics system 108, the reporting system 140, etc. can be instantiated for each tenant or shared by multiple tenants. In some such implementations where components are shared by multiple tenants, the components can maintain separate directories for the different tenants to ensure their mutual exclusivity and/or independence from each other. Similarly, in some such implementations, the monitoring and analytics system 110 can use different hosting computing systems or different isolated execution environments to process the data from the different tenants as part of the monitoring system 106, the analytics system 108, the reporting system 140, etc.

In some implementations, individual components of the monitoring system 106, the analytics system 108, the reporting system 140, etc. may be instantiated for each tenant or shared by multiple tenants. For example, some individual intake system components (e.g., forwarders, output ingestion buffer) may be instantiated and designated for individual tenants, while other intake system components (e.g., a data retrieval subsystem, intake ingestion buffer, and/or streaming data processor), may be shared by multiple tenants.

In some cases, by sharing more components with different tenants, the functioning of the monitoring and analytics system 110 can be improved. For example, by sharing components across tenants, the monitoring and analytics system 110 can improve resource utilization thereby reducing an amount of resources allocated as a whole.

Figure 2:
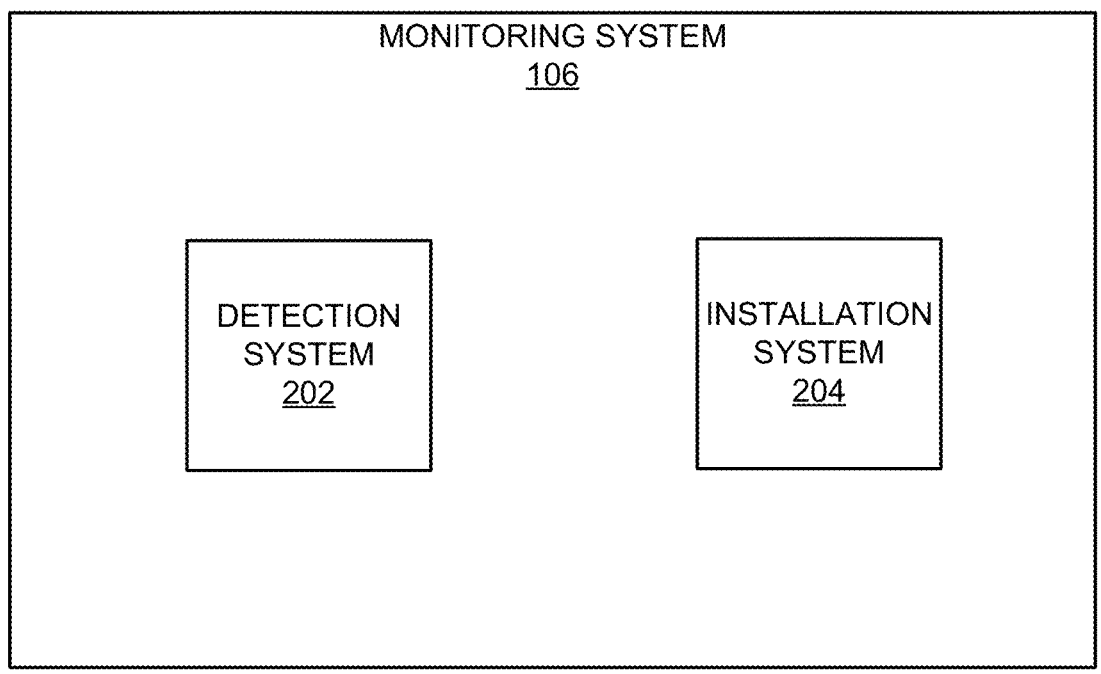
FIG. 2 is a block diagram of components of a monitoring system, according to at least one implementation.

FIG. 2 illustrates example components of the monitoring system 106 of FIG. 1, according to one example implementation. In one implementation, the monitoring system 106 may be implemented as a single computing device, multiple distributed computing systems, one or more virtual computing devices, etc. In yet another implementation, the monitoring system 106 may provide one or more monitoring services to one or more clients.

As shown, the monitoring system 105 includes a detection system 202. In one implementation, the detection system 202 may include computing hardware and/or software for iteratively discovering entities within a monitored environment (such as the monitored environment 104 of FIG. 1, the monitored environment 402 of FIG. 4, etc.). Various examples of how this iterative discovery is performed are illustrated herein.

Additionally, the monitoring system 106 includes an installation system 204. In one implementation, the installation system 204 may include computing hardware and/or software for identifying, installing, and configuring monitoring agents within entities of a monitored environment (such as the monitored environment 104 of FIG. 1, the monitored environment 402 of FIG. 4, etc.). Various examples of how this identification, installation, and configuration is performed are illustrated herein.

Figure 3:
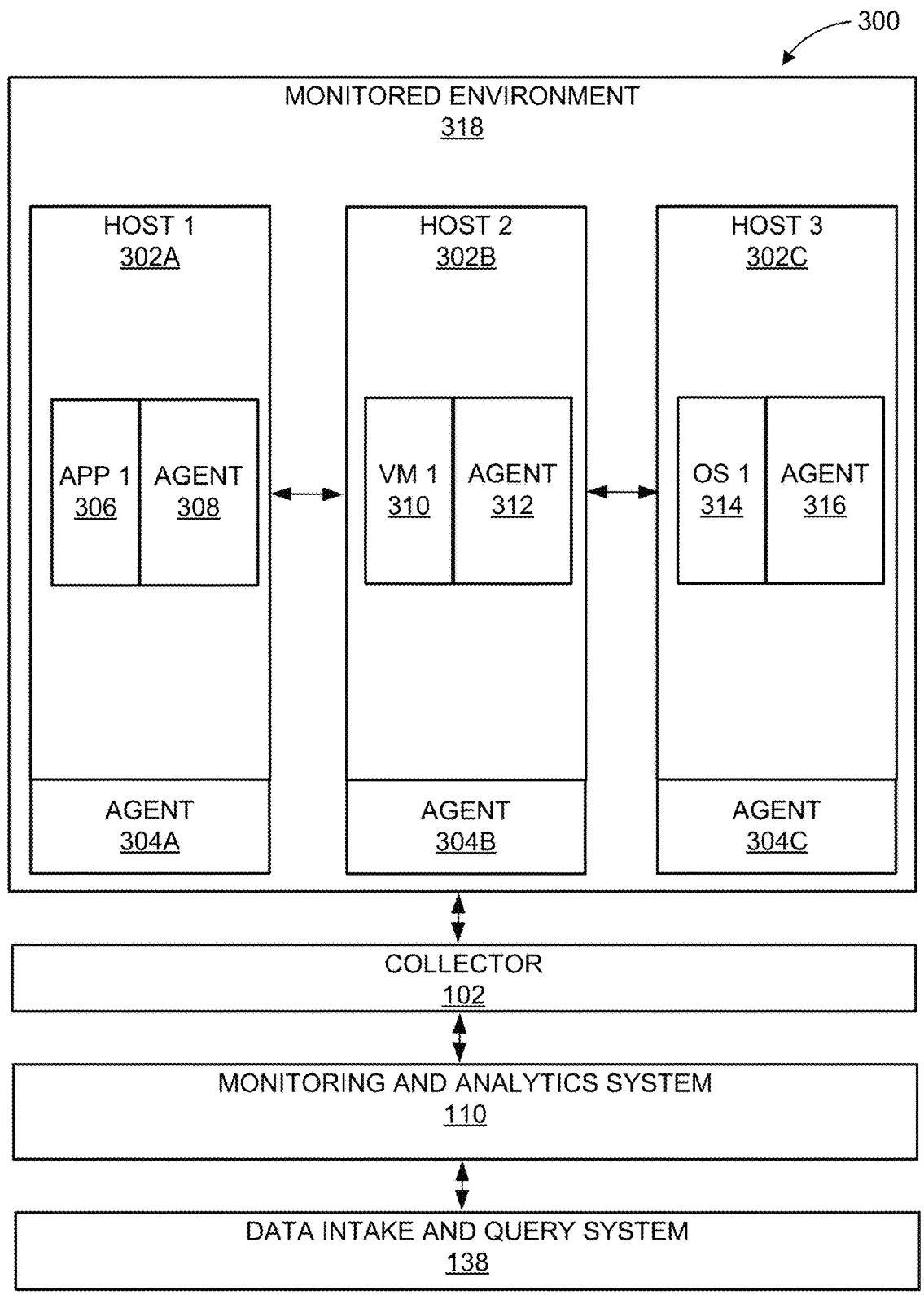
FIG. 3 is a block diagram of an iterative instrumentation environment with specific example entities, according to at least one implementation.

FIG. 3 illustrates an example iterative instrumentation environment 300 with specific example entities, according to one implementation. As shown, a monitoring system 320 is in communication with a monitored environment 318 that includes a first host, 302A, a second host 302B, and a third host 302C. Within the monitored environment 318, the first host 302A is connected to the second host 302B, and the second host 302B is connected to the third host 302C.

Additionally, in one implementation, a monitoring agent 304A may be installed within the monitored environment 318 prior to the monitoring and analytics system 110 (specifically, the monitoring system 106 within the monitoring and analytics system 110) performing iterative discovery. During discovery, telemetry data sent by the monitoring agent 304A for the first host 302A may be analyzed by the monitoring and analytics system 110, and as a result of the analysis, the monitoring and analytics system 110 may identify an application 306 installed within the first host 302A, as well as a second host 302B in communication with the first host 302A.

Further, in response to identifying the application 306, the monitoring and analytics system 110 may identify a monitoring agent 308 to be installed within the application 306. The monitoring and analytics system 110 may automatically install and configure the monitoring agent 308 within the application 306. Likewise, in response to identifying the second host 302B, the monitoring and analytics system 110 may identify a monitoring agent 304B to be installed within the second host 302B. The monitoring and analytics system 110 may automatically install and configure the monitoring agent 304B within the second host 302B.

Further still, after installing and configuring the monitoring agents 308 and 304B, the monitoring and analytics system 110 may perform another iteration of discovery in which telemetry data sent by the monitoring agents 308 and 304B may be analyzed by the monitoring system 320. As a result of the analysis, the monitoring and analytics system 110 may identify a virtual machine 310 installed within the second host 302B, as well as a third host 302C in communication with the second host 302B.

Also, in response to identifying the virtual machine 310, the monitoring and analytics system 110 may identify a monitoring agent 312 to be installed within the virtual machine 310. The monitoring and analytics system 110 may automatically install and configure the monitoring agent 312 within the virtual machine 310. Likewise, in response to identifying the third host 302C, the monitoring and analytics system 110 may identify a monitoring agent 304C to be installed within the third host 302C. The monitoring and analytics system 110 may automatically install and configure the monitoring agent 304C within the third host 302C.

In addition, after installing and configuring the monitoring agents 312 and 304C, the monitoring and analytics system 110 may perform another iteration of discovery in which telemetry data sent by the monitoring agents 312 and 304C may be analyzed by the monitoring and analytics system 110. As a result of the analysis, the monitoring system 320 may identify an operating system 314 installed within the third host 302C.

Furthermore, in response to identifying the operating system 314, the monitoring and analytics system 110 may identify a monitoring agent 316 to be installed within the operating system 314. The monitoring and analytics system 110 may automatically install and configure the monitoring agent 316 within the operating system 314.

Also, in one example, the monitoring and analytics system 110 may identify a category for each monitoring agent. For example, the monitoring and analytics system 110 may add each monitoring agent 304A-C for the hosts 302A-C to a host agent category. Likewise, the monitoring and analytics system 110 may add the monitoring agent 308 for the application 306 to an application agent category, the monitoring system 320 may add the monitoring agent 312 for the virtual machine 310 to a virtual machine agent category, and the monitoring system 320 may add the monitoring agent 316 for the operating system 314 to an operating system agent category.

Further, in one implementation, the monitoring and analytics system 110 may present one or more features of the monitored environment 318 to one or more user devices 322 (e.g., utilizing an interface such as a graphical user interface (GUI). For example, a component of the monitoring and analytics system 110 (such as the reporting system 140 shown in FIG. 1) may list all entities that have been identified within the monitored environment 318, all instrumented entities within the monitored environment 318, all monitoring agents within the monitored environment 318, all categories of monitoring agents within the monitored environment 318, etc.

In this way, the monitoring and analytics system 110 may iteratively discover all hosts 302A-C within the monitored environment 318, as well as all entities installed within such hosts. Monitoring agents may then be identified, installed, and configured on all hosts and installed entities.

Figure 4:
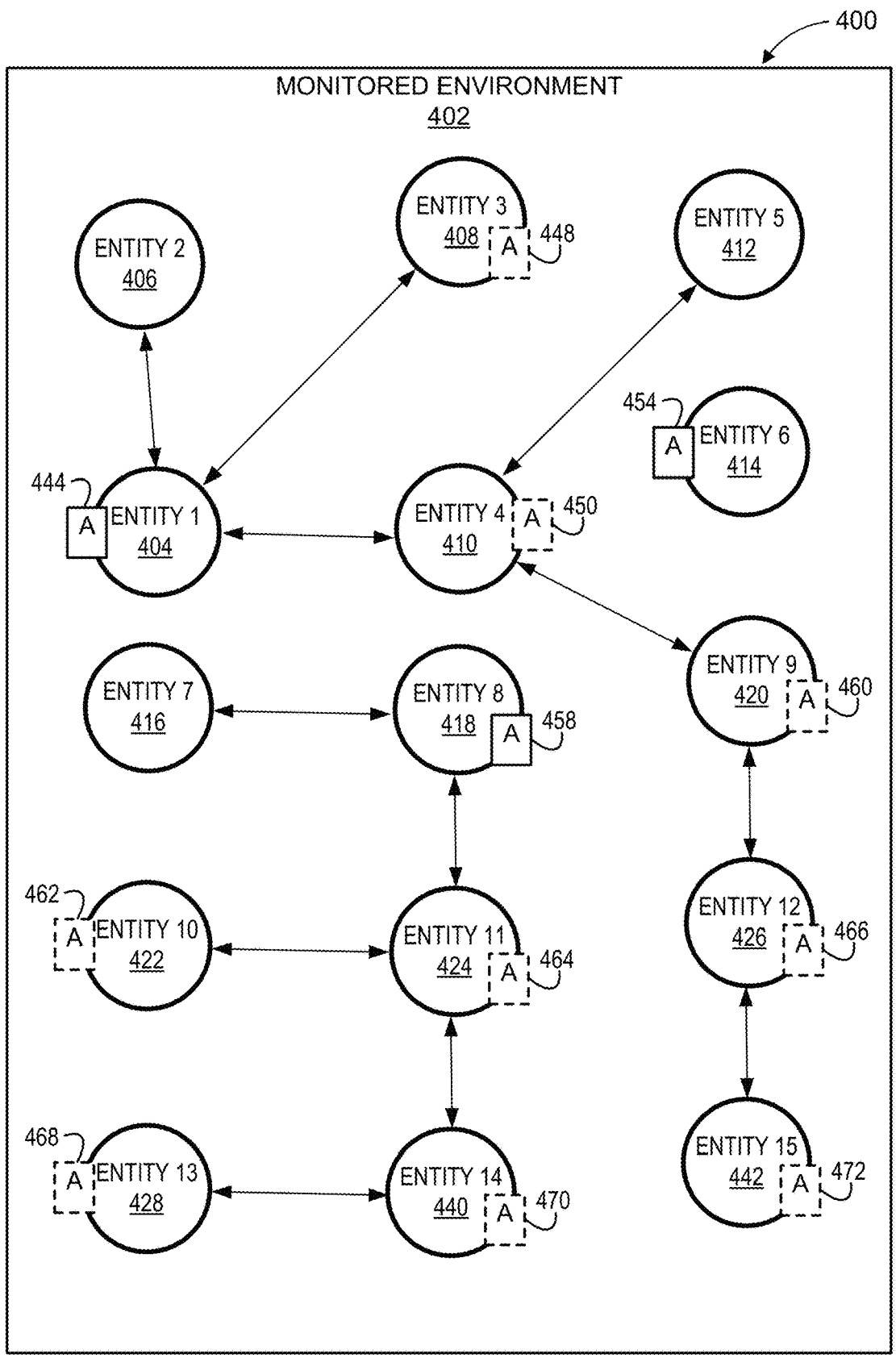
FIG. 4 is an example of iterative instrumentation within a monitored environment, according to at least one implementation.

FIG. 4 illustrates an example iterative instrumentation 400 within a monitored environment 402, according to one implementation. In one implementation, a monitoring system (such as the monitoring system 106 of FIG. 1) may perform iterative discovery within the monitored environment 402. For example, at the start of the iterative instrumentation process, it may be determined that only the first entity 404, the sixth entity 414, and the eighth entity 418 are instrumented (e.g., the first entity 404 has a first monitoring agent 444 installed, the sixth entity 414 has a sixth monitoring agent 454 installed, and the eighth entity 418 has an eighth monitoring agent 458 installed). The monitoring agents 444, 454, and 458 installed within their respective entities 404, 414, and 418 may monitor actions performed by such entities 404, 414, and 418 within the monitored environment 402. For example, the monitoring agents 444, 454, and 458 may identify all data received and sent by their respective entities 404, 414, and 418, any processing performed by their respective entities 404, 414, and 418, etc.

Further still, in one implementation, during a first iteration, the monitoring agents 444, 454, and 458 may send the results of the monitoring as a first set of telemetry data to a monitoring system (such as the monitoring system 106 of FIG. 1). This telemetry data may be analyzed by the monitoring system 214 to determine entities connected to the first entity 404, the sixth entity 414, and the eighth entity 418. For example, the monitoring data may be parsed by the monitoring system, and the results of the parsing may identify a second entity 406, a third entity 408, and a fourth entity 410 that are connected to the first entity 404. Likewise, the results of the parsing may identify a seventh entity 456 and an eleventh entity 424 that are connected to the eighth entity 418. It also may be determined, after parsing the monitoring data, that no entities are detected that are connected to the sixth entity 414.

Also, in one implementation, in response to identifying the second entity 406, third entity 408, fourth entity 410, seventh entity 416, and eleventh entity 424, the monitoring system may determine that each of these discovered entities is uninstrumented (e.g., such entities do not currently have a monitoring agent installed). For example, the monitoring system may determine that none of the discovered entities are included within a list of instrumented entities. In another implementation, the monitoring system may determine that the second entity 406 and the seventh entity 416 are unable to be instrumented (e.g., a monitoring agent is unable to be installed within such entities, or a user has instructed that these entities are not to be instrumented).

In one implementation, the monitoring system may determine that the third entity 408, fourth entity 410, and eleventh entity 424 are able to be instrumented. In response to this determination, the monitoring system may instrument these entities by installing a third monitoring agent 448 within the third entity 408, a fourth monitoring agent 450 within the fourth entity 410, and an eleventh monitoring agent 464 within the eleventh entity 424.

Further, during a second iteration, the newly installed monitoring agents 448, 450, and 464 may determine and send results of monitoring as a second set of telemetry data to the monitoring system. This telemetry data may be analyzed by the monitoring system to determine entities connected to the third entity 408, the fourth entity 410, and the eleventh entity 424. For example, the monitoring data may be parsed by the monitoring system, and the results of the parsing may identify a fifth entity 412 and a ninth entity 420 that are connected to the fourth entity 410. Likewise, the results of the parsing may identify a tenth entity 422 and a fourteenth entity 440 that are connected to the eleventh entity 424. It also may be determined, after parsing the monitoring data, that no additional entities are detected that are connected to the third entity 408.

Also, in one implementation, in response to identifying the fifth entity 412, ninth entity 420, tenth entity 422, and fourteenth entity 440, the monitoring system may determine that each of these discovered entities is uninstrumented. In another implementation, the monitoring system may determine that the fifth entity 412 is unable to be instrumented.

In one implementation, the monitoring system may determine that the ninth entity 420, tenth entity 422, and fourteenth entity 440 are able to be instrumented. In response to this determination, the monitoring system may instrument these entities by installing a ninth monitoring system 460 within the ninth entity 420, a tenth monitoring system 462 within the tenth entity 422, and a fourteenth monitoring agent 470 within the fourteenth entity 440.

Further, during a third iteration, the newly installed monitoring agents 460, 462, and 470 may determine and send results of monitoring as a third set of telemetry data to the monitoring system. This telemetry data may be analyzed by the monitoring system to determine entities connected to the ninth entity 420, the tenth entity 422, and the fourteenth entity 440. For example, the monitoring data may be parsed by the monitoring system, and the results of the parsing may identify a twelfth entity 426 that is connected to the ninth entity 420. Likewise, the results of the parsing may identify a thirteenth entity 428 that is connected to the fourteenth entity 440. It also may be determined, after parsing the monitoring data, that no additional entities are detected that are connected to the tenth entity 422.

Also, in one implementation, in response to identifying the twelfth entity 426 and thirteenth entity 428, the monitoring system may determine that each of these discovered entities is uninstrumented. In another implementation, the monitoring system may determine that both the twelfth entity 426 and thirteenth entity 428 are able to be instrumented. In response to this determination, the monitoring system may instrument these entities by installing a twelfth monitoring agent 466 within the twelfth entity 426 and a thirteenth monitoring agent 468 within the thirteenth entity 428.

Further, during a fourth iteration, the newly installed monitoring agents 466 and 468 may determine and send results of monitoring as a fourth set of telemetry data to the monitoring system. This telemetry data may be analyzed by the monitoring system to determine entities connected to the twelfth entity 426 and the thirteenth entity 428. For example, the monitoring data may be parsed by the monitoring system, and the results of the parsing may identify a fifteenth entity 442 that is connected to the twelfth entity 426. It also may be determined, after parsing the monitoring data, that no additional entities are detected that are connected to the thirteenth entity 428.

Also, in one implementation, in response to identifying the fifteenth entity 442, the monitoring system may determine this discovered entity is uninstrumented. In another implementation, the monitoring system may determine that the fifteenth entity 442 is able to be instrumented. In response to this determination, the monitoring system may instrument the fifteenth entity 442 by installing a fifteenth monitoring agent 472 within the fifteenth entity 442.

Further, during a fifth iteration, the newly installed monitoring agent 472 may determine and send results of monitoring as a fifth set of telemetry data to the monitoring system. This telemetry data may be analyzed by the monitoring system to determine entities connected to the fifteenth entity 442. For example, the monitoring data may be parsed by the monitoring system, and the results of the parsing may indicate that no additional entities are detected that are connected to the fifteenth entity 442. In response to determining that no additional entities are discovered, the iterative discovery process may end.

In this way, the monitoring system may perform an iterative discovery of all entities 404-442 within the monitored environment 402 and may automatically install and configure monitoring agents for uninstrumented entities when possible. In one implementation, the iterative discovery may stop after a predetermined number of iterations, when a predetermined number of entities have been discovered, etc.

Figure 5:
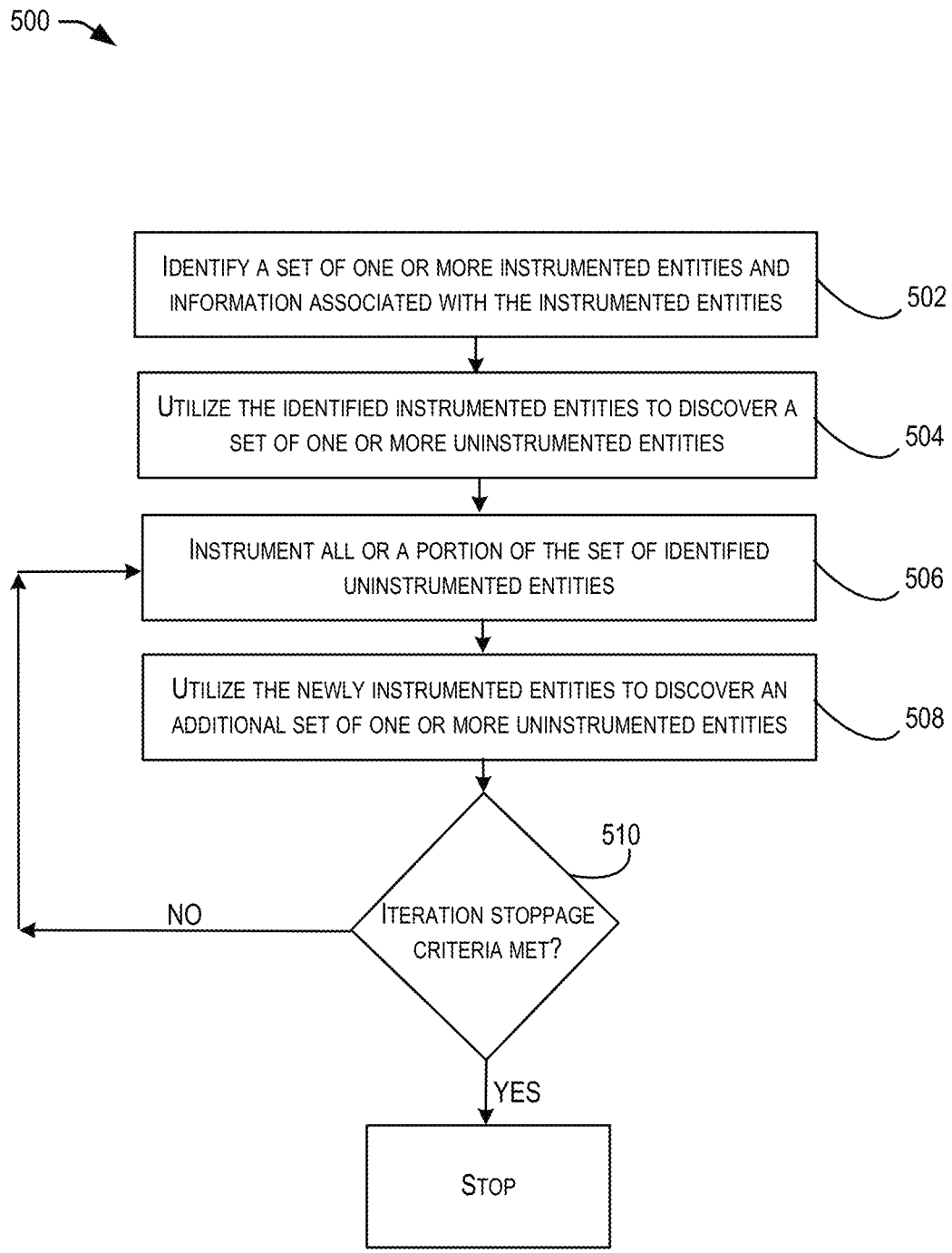
FIG. 5 illustrates an example method for iteratively discovering and instrumenting entities, according to at least one implementation.

FIG. 5 illustrates an example method 500 for iteratively discovering and instrumenting entities, according to at least one implementation. The method 500 may be performed by one or more components of the environments FIGS. 1-3. A computer-readable storage medium comprising computer-readable instructions that, upon execution by one or more processors of a computing device, cause the computing device to perform the method 500. The method 500 may be performed in any suitable order. It should be appreciated that the method 500 may include a greater number or a lesser number of steps than that depicted in FIG. 5.

The method 500 may begin at 502, where a set of one or more instrumented entities and information associated with the instrumented entities is identified. In one implementation, each of the set of one or more instrumented entities may include a physical computing device (such as a bare metal server), a virtual computing device (such as a virtual machine), etc., an application installed within a physical computing device or virtual computing device, an operating system (OS) installed within a physical computing device or virtual computing device, a networking device (such as a router or gateway), etc.

Also, in one implementation, the information associated with the instrumented entities may include an identification of monitoring agents installed within each of the instrumented entities. For example, each of the instrumented entities may be "instrumented" in that a monitoring agent is installed within the entity. The information associated with the instrumented entities may also include an indication as to how the monitoring agent is installed within the entity, a version of the monitoring agent, etc.

Additionally, at 504, the identified instrumented entities are used to discover a set of one or more uninstrumented entities. In one implementation, the uninstrumented entities may include entities that do not have a monitoring agent installed (or have a monitoring agent installed that is non-functional, outdated, etc.). In another implementation, monitoring agents installed within the instrumented entities may provide telemetry data from the entities on which the monitoring agents are installed. For example, the telemetry data may include data sent and received by the entity.

In one implementation, the telemetry data may include one or more logs, one or more metrics, etc. In another implementation, the telemetry data may include one or more communications between the first entity and one or more additional entities within the monitored environment. In yet another implementation, the telemetry data may include trace data. Also, in one implementation, the telemetry data may be parsed to extract one or more identifiers of the one or more uninstrumented entities. In another implementation, the telemetry data may be compared to predetermined instances of telemetry data (e.g., instances of telemetry data that correspond to a predetermined entity). For example, each of the predetermined instances of telemetry data may be linked to a predetermined entity. In another example, in response to determining a match between the collected telemetry data and a predetermined instance of telemetry data, a predetermined uninstrumented entity linked to the matching predetermined instance of telemetry data may be identified.

In one implementation, the identified instrumented entities may be compared to a list of all known entities within a system. For example, the list of all known entities may be compiled and stored at a central repository (e.g., a cloud service provider, etc.). The list of all known entities may be retrieved from the central repository, and the identified instrumented entities may be removed from the list. All entities within the list that remain after removing the identified instrumented entities may be included within the set of one or more uninstrumented entities.

In one implementation, an instrumented entity of a first type may be used to discover an uninstrumented entity of a second type. For example, an agent installed within an instrumented virtual machine may report telemetry data that may be used to discover an uninstrumented application process on the virtual machine within the monitored environment.

Figure 6:
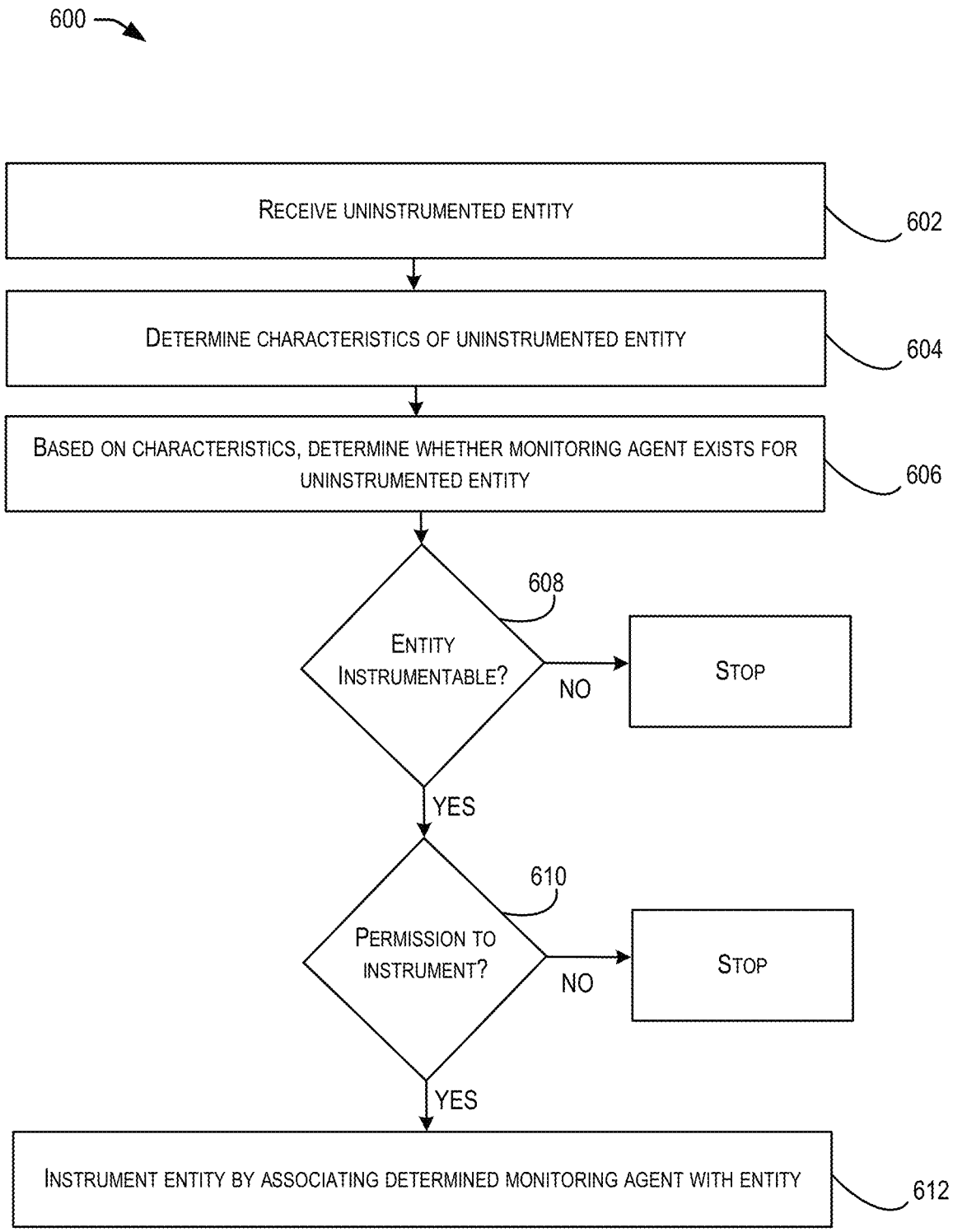
FIG. 6 illustrates an example method for instrumenting an uninstrumented entity, according to at least one implementation.

Further, at 506, all or a portion of the set of identified uninstrumented entities are instrumented. FIG. 6 illustrates one implementation of such instrumenting. Further still, at 508, the newly instrumented entities are utilized to discover an additional set of one or more uninstrumented entities. For example, the newly instrumented entities may provide additional telemetry data that is analyzed in a manner similar to 504 to discover the additional set of one or more uninstrumented entities.

Also, at decision 510, it is determined whether iteration stoppage criteria have been met. In one implementation, the stoppage criteria may be met in response to identifying that a predetermined number of discovery iterations have occurred. For example, a counter may be incremented (e.g., by increasing an integer value by a value of one) each time instrumented entities are utilized to discover uninstrumented entities. When the counter reaches a predetermined integer value, the iteration stoppage criteria may be met. In another example, the stoppage criteria may be met in response to determining that a predetermined number of uninstrumented entities have been discovered, a predetermined depth has been reached within a graph of monitored entities, etc. In yet another example, the stoppage criteria may be met in response to determining that no known uninstrumented entities remain.

In response to determining in decision 510 that iteration stoppage criteria have been met, the method 500 stops. In response to determining in decision 510 that iteration stoppage criteria have not been met, the method 500 repeats operation 506 with the additional set of one or more uninstrumented entities, such that all or a portion of the additional set of one or more uninstrumented entities are instrumented.

In this way, uninstrumented entities may be iteratively discovered until one or more predetermined criteria have been met.

FIG. 6 illustrates an example method 600 for instrumenting an uninstrumented entity, according to at least one implementation. The method 600 may be performed by one or more components of the environments FIGS. 1-3. A computer-readable storage medium comprising computer-readable instructions that, upon execution by one or more processors of a computing device, cause the computing device to perform the method 600. The method 600 may be performed in any suitable order. It should be appreciated that the method 600 may include a greater number or a lesser number of steps than that depicted in FIG. 6. [0100] The method 600 may begin at 602, where an uninstrumented entity is received. In one implementation, the uninstrumented entity may include an entity that is discovered as a result of performing iterative discovery. One implementation of such discovery is shown at step 504 of FIG. 4.

Additionally, at 604, characteristics of the uninstrumented entity are determined. In one implementation, the characteristics of the entity may include metadata describing one or more aspects of the entity (e.g., a software or hardware version, a name of software or hardware, one or more current settings for the hardware or software, etc.). In another implementation, the characteristics of the entity may include a location of the entity, an environment in which the entity is implemented, a type of the entity, etc.

Further, at 606, it is determined whether a monitoring agent exists for the uninstrumented entity. In one implementation, it may be determined that multiple different monitoring agents exist for the uninstrumented entity. For example, the characteristics of the entity may be analyzed to determine whether one or more monitoring agents can be implemented for the entity. In another example, a data store (such as a table) may store predetermined entity characteristics, where such characteristics may be mapped to predetermined monitoring agents to be implemented for entities having those characteristics.

Further still, in one implementation, the characteristics of the entity may be compared to the predetermined entity characteristics. In another implementation, a predetermined monitoring agent mapped to predetermined entity characteristics that match the characteristics of the second entity may be selected as the monitoring agent to be implemented for the entity. In yet another implementation, if no match can be made between the predetermined entity characteristics and the characteristics of the second entity, it may be determined that a monitoring agent cannot be installed within the entity.

Also, in one implementation, a machine learning environment may be trained to take entity characteristics as input, and to output an indication of a monitoring agent for installation within the entity. In another implementation, the characteristics of the entity may be provided as input into the trained machine learning environment, and the trained machine learning environment may output an indication of the monitoring agent to be installed within the entity. Alternatively, the trained machine learning environment may output an indication that no monitoring agent can be determined for installation within the entity.

Additionally, at decision 608, it is determined whether the entity is instrumentable. In one implementation, determining whether the entity is instrumentable may include determining whether one or more monitoring agents are available for installation within the entity. In response to determining in decision 604 that the entity is not instrumentable, the method 600 stops. For example, it may be determined that no monitoring agents can be identified for installation within the entity.

In response to determining in decision 609 that the entity is instrumentable, at decision 610 it is determined whether permission exists to instrument the entity. For example, a proposed monitoring agent determined to exist for installation within the entity may be presented to a user for their review and approval. In response to receiving approval from the user, it may be determined that permission exists to instrument the entity. In another implementation, the user may be presented with multiple monitoring agents available for installation within the entity, and the user may select one of the multiple agents. In another example, one or more rules may be saved in association with the entity (e.g., as metadata for such an entity), where such rules indicate whether permission exists to instrument the entity.

In response to determining in decision 610 that permission does not exist to instrument the entity, the method 600 stops. In response to determining in decision 610 that permission does exist to instrument the entity, at 612 the entity is instrumented by associating the determined monitoring agent with the entity. For example, the determined monitoring agent may be installed within the entity (e.g., by the monitoring system 106 of FIG. 1, etc.). In another example, instrumenting the entity may include activating and configuring the monitoring agent within the entity. In one implementation, multiple agents may be identified, installed, activated, and configured within the entity.

In this way, monitoring agents may be identified and conditionally implemented within an uninstrumented entity.

Figure 7:
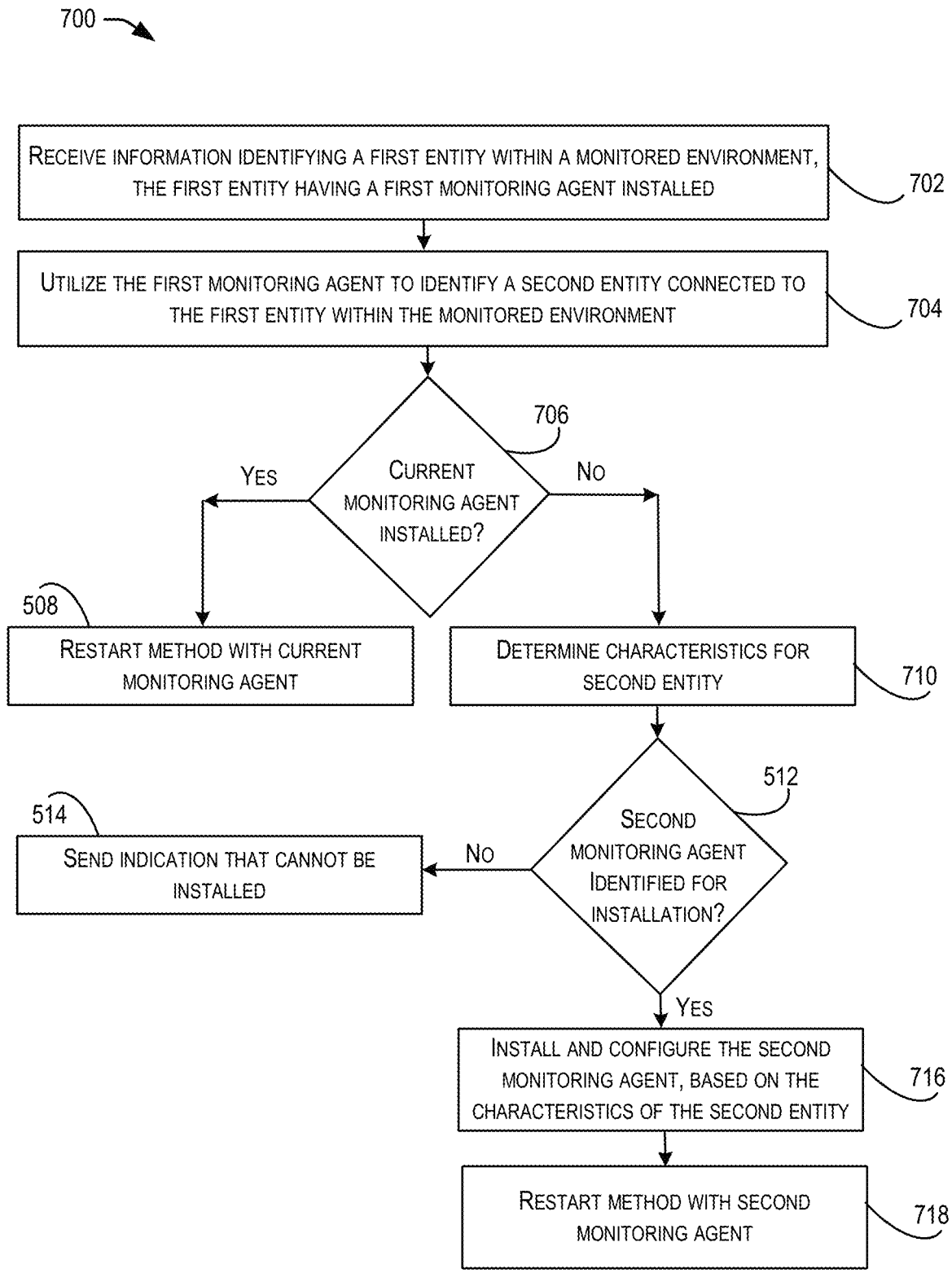
FIG. 7 illustrates an example method for iteratively discovering and instrumenting entities, according to at least one implementation.

FIG. 7 illustrates an example method 700 for iteratively discovering and instrumenting entities, according to at least one implementation. The method 700 may be performed by one or more components of the environments FIGS. 1-3. A computer-readable storage medium comprising computer-readable instructions that, upon execution by one or more processors of a computing device, cause the computing device to perform the method 700. The method 700 may be performed in any suitable order. It should be appreciated that the method 700 may include a greater number or a lesser number of steps than that depicted in FIG. 7.

The method 700 may begin at 702, where information identifying a first entity within a monitored environment is received, where a first monitoring agent is installed within the first entity. In one implementation, the monitored environment may include a distributed system including a plurality of hardware or virtual devices (such as servers, data storage, or other computing hardware) that communicate via one or more communication networks. Additionally, in one implementation, the first entity may include a physical computing device (such as a bare metal server), a virtual computing device (such as a virtual machine), etc., an application installed within a physical computing device or virtual computing device, an operating system (OS) installed within a physical computing device or virtual computing device, etc.

Further, in one implementation, the monitored environment may include a multi-tenant system that provides resources to a plurality of different tenants. Further still, in one implementation, the monitored environment may include a cloud computing system. Also, in one implementation, access to the monitored environment may be provided to a monitoring system by the user of the monitored environment (e.g., a tenant of a multi-tenant environment, etc.). For example, the user may provide a username and password for a user account within the monitored environment. In another example, the monitoring system may then access the user account and identify the first entity within the user account.

In addition, in one implementation, the first monitoring agent installed within the first entity may send identification information to the monitoring system. For example, the identification information may identify the first entity, and may include an indication that the first monitoring agent is installed within the first entity. Furthermore, in one implementation, monitoring agents may include instrumentation functionality that identifies and retrieves telemetry data from an entity on which the monitoring agent is installed. For example, the telemetry data may include data sent and received by the entity.

Further still, in one implementation, the monitoring agent may provide such operational data to one or more additional entities (such as a collector, the monitoring system, etc.). Also, in one implementation, the monitoring agent may provide the operational data periodically, as it is created, according to a predetermined schedule, etc. In another implementation, the monitoring agent may include a gateway that performs indirect monitoring of the entity (without being installed within the entity itself).

Additionally, at 704, the first monitoring agent is utilized to identify a second entity connected to the first entity within the monitored environment. In one implementation, the first monitoring agent may monitor data input to and output by the first entity within the monitored environment. In another implementation, the first monitoring agent may monitor actions performed by the first entity within the monitored environment. In yet another implementation, the monitored data and actions may be sent by the monitoring agent as telemetry data to one or more entities (such as a monitoring system).

Further, in one implementation, the telemetry data may include one or more logs, one or more metrics, etc. In another implementation, the telemetry data may include one or more communications between the first entity and one or more additional entities within the monitored environment. In yet another implementation, the telemetry data may include trace data.

For example, a trace may include details of a transaction that propagates from one service to another within a distributed computing environment. This transaction may include an end-to-end request-response flow, starting with the sending of an initial request and ending with the receipt of a final response to such request. In another example, the trace may follow a course of a transaction from its source to its ultimate destination in a distributed computing environment. The trace may be conceptualized as a highly dimensional structured log that captures a full graph of user-generated and background request execution and which contains information about interactions as well as causality. In another example, a trace may include a plurality of spans, where each span may indicate an individual unit of work performed during a particular transaction. Each identified span may be provided with associated tags, and these tags may include data such as a unique span identifier (ID), a service name, an operation name, a duration (e.g., a latency between the sending of the query to the database and the receipt of a response from the database), start and end timestamps, etc.

Further still, in one implementation, the telemetry data may be sent to a monitoring system for storage and/or analysis (such as the monitoring system 106 of FIG. 1, etc.). In another implementation, the collected telemetry data may be analyzed to determine the second entity within the distributed system. For example, the analysis may be performed by the monitoring agent and/or by another entity (such as the monitoring system).

Also, in one implementation, the telemetry data may be parsed to extract one or more identifiers of the second entity. In another implementation, the telemetry data may be compared to predetermined instances of telemetry data. For example, each of the predetermined instances of telemetry data may be linked to a predetermined entity. In another example, in response to determining a match between the collected telemetry data and a predetermined instance of telemetry data, a predetermined entity linked to the matching predetermined instance of telemetry data may be identified.

In addition, in one implementation, the second entity may be separate from the first entity and may communicate with the first entity via a communications network. In another implementation, the second entity may be installed within the first entity. For example, the first entity may include a first host implemented within the distributed system, and the second entity may include an application running within the first host that is identified by telemetry data received from and/or sent to the application by the first host. In another example, the telemetry data may be identified by the first monitoring agent installed within the first entity. In yet another example, the second entity may include a second host running within the distributed system that is communicating with the first host.

Furthermore, at decision 706, it is determined whether a current monitoring agent is installed within the second entity. For example, one or more queries may be sent to the second entity (e.g., by the monitoring system). In another example, these queries may request an identifier of a monitoring agent installed within the second entity. In yet another example, these queries may request telemetry data from a monitoring agent installed within the second entity. This telemetry data may include a version number of a currently installed monitoring agent within the second entity. This version number may be compared to a threshold version number, and if the version number falls below the threshold number, the monitoring agent may be determined to be outdated (e.g., not current). If the version number matches or exceeds the threshold number, the monitoring agent may be determined to be current. If no response to the one or more queries is received, it may be determined that no monitoring agent is installed within the second entity.

Further still, if it is determined at decision 706 that a current monitoring agent is installed within the second entity, then at 708 the example method 700 is restarted with the second monitoring agent. For example, a response may be received from the second entity indicating that a second monitoring agent is installed within the second entity. This response may include an identifier of the second monitoring agent. In another example, the response may include telemetry data obtained by the second monitoring agent. In response to determining that the second monitoring agent is installed within the second entity, the second monitoring agent may be utilized to identify a third entity connected to the second entity within the monitored environment.

Also, if it is determined at decision 706 that the current monitoring agent is not installed within the second entity, then at 710, characteristics of the second entity are determined. In one implementation, a response may be received from the second entity indicating that a monitoring agent is not installed within the second entity. In another implementation, no response may be received from the second entity in response to sending one or more queries to the second entity (e.g., by the monitoring system). For example, this lack of a response may be interpreted to indicate that no monitoring agent is installed on the second entity.

Additionally, in one implementation, the characteristics of the second entity may include metadata describing one or more aspects of the second entity (e.g., a software or hardware version, a name of software or hardware, one or more current settings for the hardware or software, etc.). In another implementation, the characteristics of the second entity may include a location of the second entity, an environment in which the second entity is implemented, a type of the second entity, etc.

Further, at decision 712, based on the characteristics for the second entity, it is determined whether a second monitoring agent is identified for installation within the second entity. For example, the characteristics of the second entity may be analyzed to determine whether a monitoring agent can be implemented for the second entity. In another example, a data store (such as a table) may store predetermined entity characteristics, where such characteristics may be mapped to predetermined monitoring agents to be implemented for entities having those characteristics.

Further still, in one implementation, the characteristics of the second entity may be compared to the predetermined entity characteristics. In another implementation, a predetermined monitoring agent mapped to predetermined entity characteristics that match the characteristics of the second entity may be selected as the monitoring agent to be implemented for the second entity. In yet another implementation, if no match can be made between the predetermined entity characteristics and the characteristics of the second entity, it may be determined that a monitoring agent cannot be installed within the second entity.

Also, in one implementation, a machine learning environment may be trained to take entity characteristics as input, and to output an indication of a monitoring agent for installation within the entity. In another implementation, the characteristics of the second entity may be provided as input into the trained machine learning environment, and the trained machine learning environment may output an indication of the second monitoring agent to be installed within the second entity. Alternatively, the trained machine learning environment may output an indication that no monitoring agent can be determined for installation within the second entity.

In addition, in response to determining at decision 712 that a second monitoring agent is not identified for installation within the second entity, then at 714 an indication is sent that a second monitoring agent cannot be installed within the second entity. The indication may include a notification that is stored, presented to one or more users via a graphical user interface (GUI), etc.

Furthermore, in response to determining at decision 712 that a second monitoring agent is identified for installation within the second entity, then at 716 the second monitoring agent is installed and configured based on the characteristics of the second entity. In one implementation, the second monitoring agent may be installed and configured automatically for the second entity by the monitoring system. For example, predetermined installation and configuration instructions may be identified by the monitoring system for the second monitoring agent. The predetermined installation and configuration instructions may include instructions for installing, activating, and/or configuring the monitoring system within the second entity. These predetermined installation instructions may be automatically performed by the monitoring system to install the second monitoring agent within the second entity.

Further still, in one implementation, one or more instructions may be provided to a user to manually implement and configure the second monitoring agent. For example, predetermined installation instructions may be identified for the second monitoring agent, and one or more issues may prevent these predetermined installation instructions from being automatically performed. These issues may include the necessity for user intervention such as user authorization, user customization, etc. In another example, these predetermined installation instructions may be presented by the monitoring system to the user so that the user may manually install the second monitoring agent within the second entity, based on the instructions.

Also, in one implementation, one or more categories of monitoring agents may be created. For example, each category may be associated with one or more predetermined characteristics for the entity in which the monitoring agent is installed. In another example, each category of monitoring agents may be associated with a predetermined configuration. In yet another example, the second monitoring agent may be matched to one of the one or more categories, and a predetermined configuration associated with the matching category may be implemented for the second monitoring agent within the second entity.

Additionally, at operation 718 the example method 700 is restarted with the second monitoring agent. For example, in response to determining that the second monitoring agent is installed within the second entity, the second monitoring agent is utilized to identify a third entity connected to the second entity within the monitored environment.

In one implementation, entity discovery may be iteratively performed within the monitored system as each monitoring agent is implemented. For example, the second monitoring agent may collect additional telemetry data produced within the distributed system, and a third entity may be identified within the distributed system, based on the additional collected telemetry data. This iterative discovery may be limited to a predetermined number of degrees of separation from the first entity. For example, only entities directly connected to the first entity may be discovered during an iteration of discovery. In another example, only entities directly connected to the first entity, as well as entities directly connected to those entities, may be discovered during an iteration of discovery.

Further, in one implementation, the monitoring agents may be continuously or periodically examined to determine if any updates are available for such monitoring agents. For example, the monitoring agents may be examined according to a predetermined schedule. In another example, if an update (e.g., updated software) is identified as available for a monitoring agent, a notification may be sent to one or more users associated with the user account. The update may be automatically applied to the monitoring agent by the monitoring system if possible. In yet another example, instructions for manually installing the update may be presented by the monitoring system to the user so that the user may manually install the update within the monitoring agent, based on the instructions.

In this way, entities may be automatically discovered within the distributed system, and monitoring agents may be automatically determined for those entities. As the monitoring agents are implemented and deployed, the telemetry data they collect can be used to identify additional entities within the distributed system. Monitoring agents may then be automatically determined and implemented for these additional entities. This may enable an automatic iterative discovery of entities within the distributed system that avoids the need for time and resource-intensive manual discovery.

Additionally, all determined entities for a distributed system, as well as their associated monitoring agents, may be presented to a user for review. In situations where a monitoring agent cannot be automatically implemented for an entity (or where an outdated monitoring agent is identified for an entity), specific instructions for manually implementing the monitoring agent may be presented to a user for implementation. This may result in an automated, iterative monitoring implementation for all entities within a user account within a distributed system.

Figure 8:
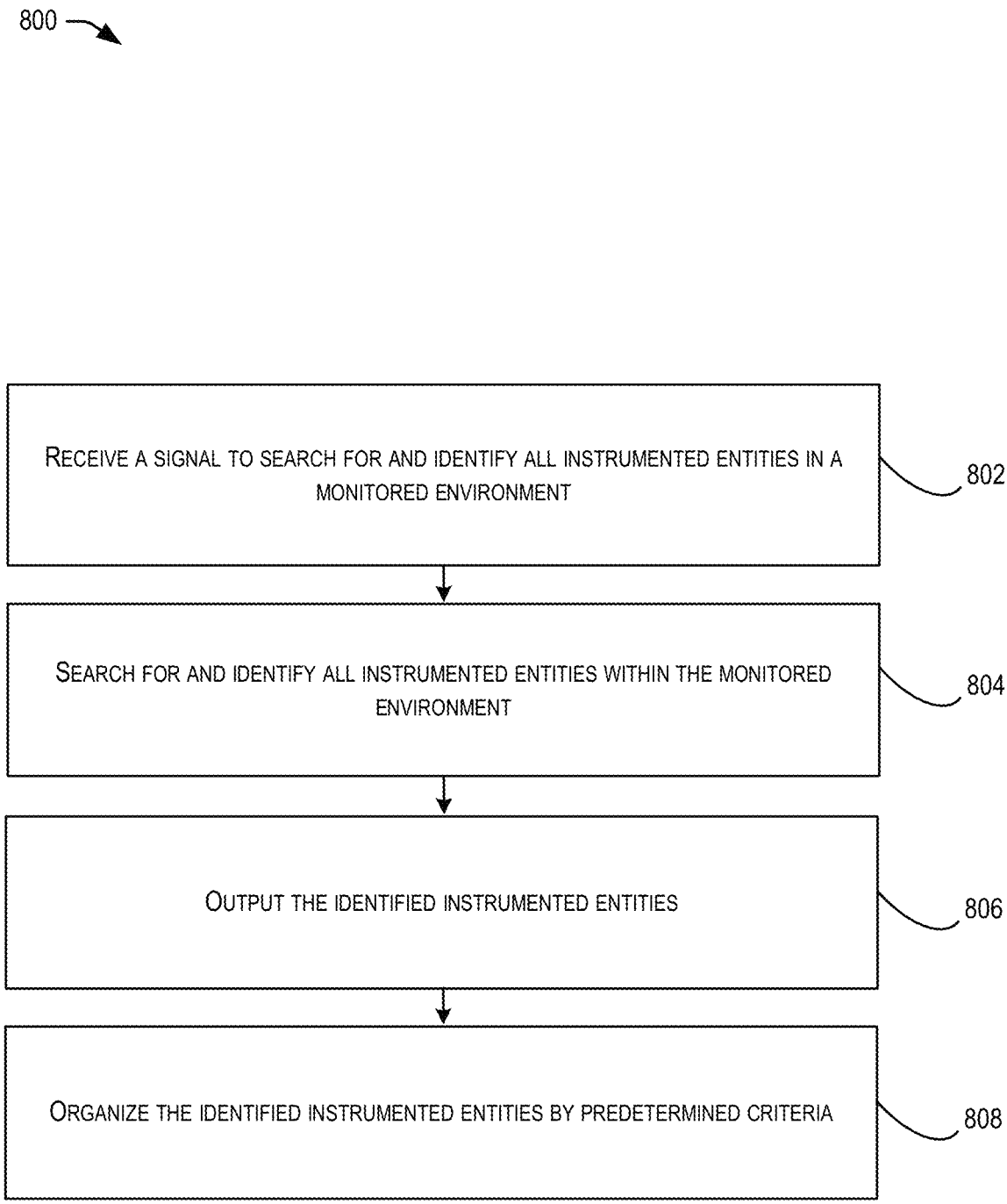
FIG. 8 illustrates an example method for discovering and organizing entities utilizing an interface, according to at least one implementation.

FIG. 8 illustrates an example method 800 for discovering and organizing entities utilizing an interface, according to at least one implementation. The method 800 may be performed by one or more components of the environments FIGS. 1-3. A computer-readable storage medium comprising computer-readable instructions that, upon execution by one or more processors of a computing device, cause the computing device to perform the method 800. The method 800 may be performed in any suitable order. It should be appreciated that the method 800 may include a greater number or a lesser number of steps than that depicted in FIG. 8.

The method 800 may begin at 802, where a signal to search for and identify all instrumented entities in a monitored environment is received. In one implementation, a plurality of different options may be presented to a user via an interface. For example, each of the options may be presented as a selectable icon within the interface. Additionally, in one implementation, each of the options may be presented via a drop-down window within the interface. Further, in one implementation, the interface may include a graphical user interface (GUI). Further still, in one implementation, a selection of one of the options may be received as the signal by a monitoring system (such as the monitoring system 106 of FIG. 1). In another example, the signal may be received via an application programming interface (API).

Also, in one implementation, instrumented entities may include entities within the monitored environment that have one or more agents installed and/or associated with it. One example of the monitored environment is the monitored environment 104 of FIG. 1. Each of the agents may be configured to collect information about the entity, including transactions associated with the entity, and transmit such information to a monitoring and analytics system (such as the monitoring and analytics system 110 of FIG. 1, etc.)

Additionally, at 804, all instrumented entities within the monitored environment are searched for and identified. In one implementation, monitoring agents installed within entities of the monitored environment may send identification information to a monitoring system. Additionally, in one implementation, the identification information may identify the entity, and may include an indication that the monitoring agent is installed within the entity. Further, in one implementation, the monitoring system may store identifiers of each entity within the monitored environment that has a monitoring agent installed. Further still, in one implementation, these stored identifiers may be retrieved in response to the selection of the option to display all entities within a monitored environment that have a monitoring agent installed.

Further, at 806, the identified instrumented entities are output. In one implementation, all of the determined entities may be listed within an interface (such as a GUI). Additionally, in one implementation, for each of the determined entities, an identifier of the entity may be provided. Further, in one implementation, for each of the determined entities, an identifier of the monitoring agent installed within the entity may be provided.

Further still, at 808 the identified instrumented entities are organized by one or more predetermined criteria. In one implementation, the identified instrumented entities may be sorted by a type of entity, a type of agent, a version of an agent, a location within a monitored environment (such as a data center) where the entity is located, etc.

Figure 9:
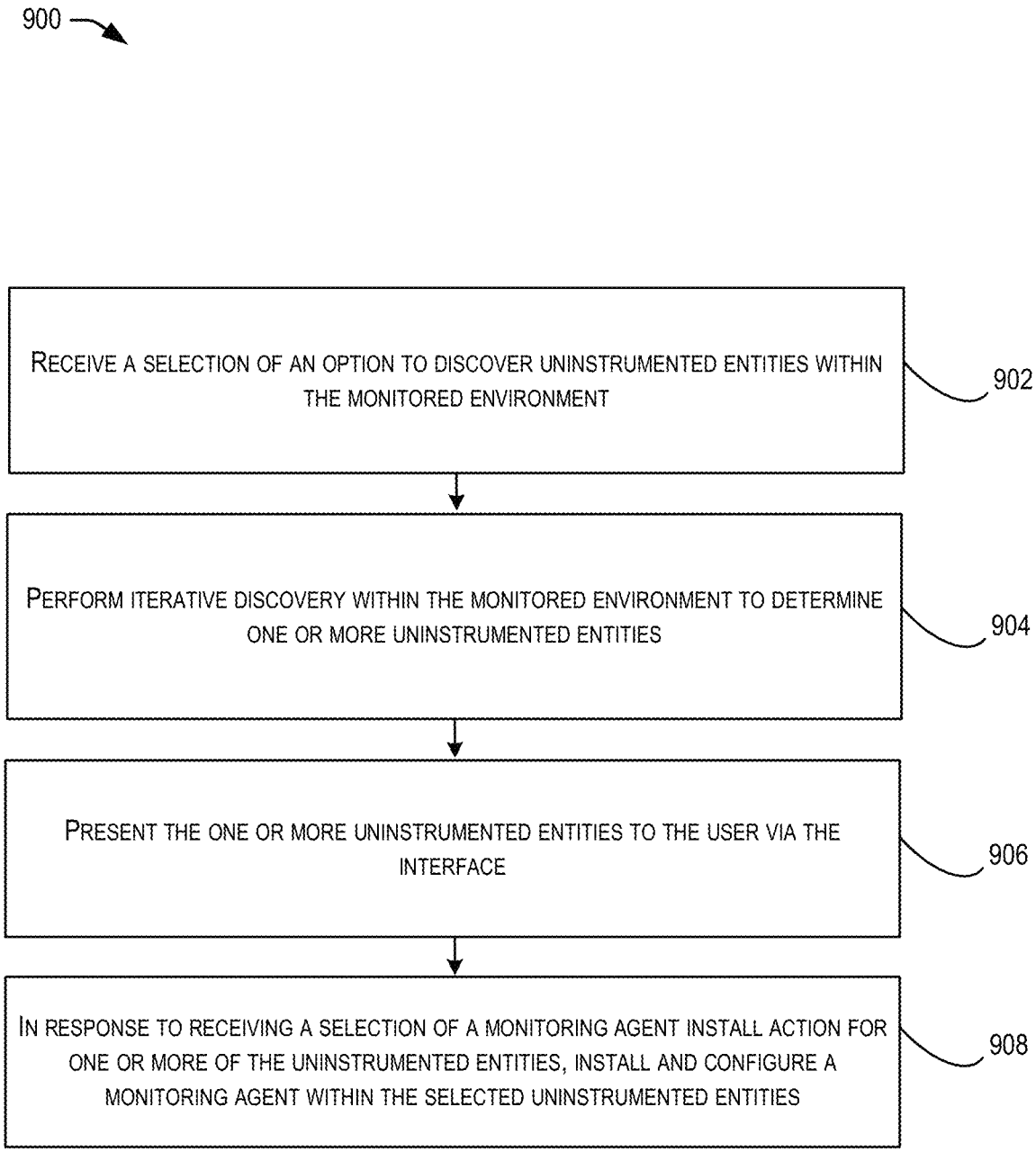
FIG. 9 illustrates an example method for discovering entities utilizing an interface, according to at least one implementation.

FIG. 9 illustrates an example method 900 for discovering entities utilizing an interface, according to at least one implementation. The method 900 may be performed by one or more components of the environments FIGS. 1-3. A computer-readable storage medium comprising computer-readable instructions that, upon execution by one or more processors of a computing device, cause the computing device to perform the method 900. The method 900 may be performed in any suitable order. It should be appreciated that the method 900 may include a greater number or a lesser number of steps than that depicted in FIG. 9.

The method 900 may begin at 902, where a selection of an option to iteratively discover uninstrumented entities within the monitored environment is received. The selection may be received via an interface such as a graphical user interface (GUI), an application programming interface (API), etc. In one implementation, a plurality of different options may be presented to a user via the interface. For example, each of the options may be presented as a selectable icon within the interface.

Additionally, in one implementation, each of the options may be presented via a drop-down window within the interface. Further, in one implementation, the interface may include a graphical user interface (GUI). Further still, in one implementation, the selection may be received by a monitoring and analytics system (such as the monitoring and analytics system 110 of FIG. 1). In another implementation, a user may be provided with a selectable option to discover uninstrumented entities within a monitored environment and may receive a signal from the user to perform such discovery.

In another implementation, one or more instrumented entities within the monitored environment may be utilized to perform such discovery. These instrumented entities may be selected by the user and may be all or a subset of all available instrumented entities within the monitored environment. In one example, a default option may automatically select all available instrumented entities within the monitored environment to be utilized to perform the discovery of uninstrumented entities.

Also, at 904, discovery is performed within the monitored environment to determine one or more uninstrumented entities. Step 504 of FIG. 5 illustrates one implementation of one such discovery process.

In addition, at 906, the one or more uninstrumented entities are presented to the user via the interface. In one implementation, all of the discovered entities may be listed within the interface. In another implementation, all of the newly discovered uninstrumented entities may be labeled as uninstrumented within the interface and may be presented in addition to all instrumented entities within the monitored environment (where the instrumented entities are labeled as instrumented within the interface). Furthermore, in one implementation, for each of the determined entities, an identifier of the entity may be provided.

Further still, at 908, in response to receiving a selection of a monitoring agent install action for one or more of the uninstrumented entities, a monitoring agent is installed and configured within the selected uninstrumented entities. Step 612 of FIG. 6 illustrates one implementation of one such instrumentation process.

In addition, in one implementation, an interface may be updated to indicate the newly instrumented entities. For example, the newly instrumented entities may be output as in step 806 of FIG. 8.

Computer programs typically comprise one or more instructions set at various times in various memory devices of a computing device, which, when read and executed by at least one processor, will cause a computing device to execute functions involving the disclosed techniques. In some implementations, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such implementations may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective implementations may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain implementations require at least one of X, at least one of Y and at least one of Z to each be present. Further, use of the phrase "at least one of X, Y or Z" as used in general is to convey that an item, term, etc. may be either X, Y or Z, or any combination thereof.

In some implementations, certain operations, acts, events, or functions of any of the algorithms described herein can be performed in a different sequence, can be added, merged, or left out altogether (e.g., not all are necessary for the practice of the algorithms). In certain implementations, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some implementations the connections between the components shown represent possible paths of data flow, rather than actual connections between hardware. While some examples of possible connections are shown, any of the subset of the components shown can communicate with any other subset of components in various implementations.

Implementations are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such implementations may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective implementations may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some implementations the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some implementations, certain operations, acts, events, or functions of any of the algorithms described herein can be performed in a different sequence, can be added, merged, or left out altogether (e.g., not all are necessary for the practice of the algorithms). In certain implementations, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method, comprising:
   displaying, by a computing system, a list of instrumented entities within a monitored environment;
   providing, by the computing system, a user selectable option to discover uninstrumented entities within the monitored environment;
   receiving, by the computing system, a signal from a user to discover the uninstrumented entities within the monitored environment;
   discovering, by the computing system, the uninstrumented entities within the monitored environment; and
   displaying, by the computing system, results of the discovering.

2. The computer-implemented method of claim 1, comprising receiving, by the computing system, a selection of one or more of the instrumented entities to be used to discover the uninstrumented entities within the monitored environment.

3. The computer-implemented method of claim 1, wherein each of the instrumented entities includes an entity with a monitoring agent installed.

4. The computer-implemented method of claim 1, wherein each of the uninstrumented entities includes:
   an entity without a monitoring agent installed, or
   an entity with a non-functional or outdated monitoring agent installed.

5. The computer-implemented method of claim 1, wherein the results of the discovering include a list of the uninstrumented entities, and comprising:
   providing, by the computing system, a user selectable option to instrument one or more of the uninstrumented entities;
   receiving, by the computing system, a signal from a user to instrument one or more of the uninstrumented entities;
   instrumenting, by the computing system, the uninstrumented entities; and
   displaying, by the computing system, results of the instrumenting.

6. The computer-implemented method of claim 1, wherein displaying, by the computing system, results of the discovering includes displaying, by the computing system, the list of instrumented entities in addition to a list of the uninstrumented entities.

7. The computer-implemented method of claim 1, comprising:
  providing, by the computing system, a user selectable option to organize the instrumented entities by entity type;
  receiving, by the computing system, a signal from a user to organize the instrumented entities by entity type;
  organizing, by the computing system, the instrumented entities by entity type; and
  displaying, by the computing system, results of the organizing.

8. The computer-implemented method of claim 1, comprising:
  providing, by the computing system, a user selectable option to organize the instrumented entities by a type of installed monitoring agent;
  receiving, by the computing system, a signal from a user to organize the instrumented entities by the type of installed monitoring agent;
  organizing, by the computing system, the instrumented entities by the type of installed monitoring agent; and
  displaying, by the computing system, results of the organizing.

9. The computer-implemented method of claim 1, comprising:
  providing, by the computing system, a user selectable option to organize the instrumented entities by a version of installed monitoring agent;
  receiving, by the computing system, a signal from a user to organize the instrumented entities by the version of installed monitoring agent;
  organizing, by the computing system, the instrumented entities by the version of installed monitoring agent; and
  displaying, by the computing system, results of the organizing.

10. The computer-implemented method of claim 1, comprising:
  automatically instrumenting, by the computing system, the discovered uninstrumented entities to create newly instrumented entities; and
  adding the newly instrumented entities to the list of instrumented entities within the monitored environment.

11. The computer-implemented method of claim 1, wherein the list of instrumented entities within the monitored environment is displayed utilizing a graphical user interface (GUI).

12. The computer-implemented method of claim 1, wherein the user selectable option is presented as a selectable icon within an interface.

13. The computer-implemented method of claim 1, wherein the user selectable option is presented within a drop-down window within an interface.

14. A system comprising:
  one or more processors configured to:
  display a list of instrumented entities within a monitored environment;
  provide a user selectable option to discover uninstrumented entities within the monitored environment;
  receive a signal from a user to discover the uninstrumented entities within the monitored environment;
  discover the uninstrumented entities within the monitored environment; and
  display results of the discovery.

15. The system of claim 14, wherein the one or more processors are further configured to receive a selection of one or more of the instrumented entities to be used to discover the uninstrumented entities within the monitored environment.

16. The system of claim 14, wherein each of the instrumented entities includes an entity with a monitoring agent installed.

17. The system of claim 14, wherein each of the uninstrumented entities includes:
  an entity without a monitoring agent installed, or
  an entity with a non-functional or outdated monitoring agent installed.

18. The system of claim 14, wherein the results of the discovering include a list of the uninstrumented entities, and wherein the one or more processors are further configured to:
  provide a user selectable option to instrument one or more of the uninstrumented entities;
  receive a signal from a user to instrument one or more of the uninstrumented entities;
  instrument the uninstrumented entities; and
  display results of the instrumenting.

19. The system of claim 14, wherein displaying results of the discovering includes displaying the list of instrumented entities in addition to a list of the uninstrumented entities.

20. A non-transitory computer-readable medium storing a set of instructions, the set of instructions when executed by one or more processors cause processing to be performed comprising:
  displaying, by a computing system, a list of instrumented entities within a monitored environment;
  providing, by the computing system, a user selectable option to discover uninstrumented entities within the monitored environment;
  receiving, by the computing system, a signal from a user to discover the uninstrumented entities within the monitored environment;
  discovering, by the computing system, the uninstrumented entities within the monitored environment; and
  displaying, by the computing system, results of the discovering.

\* \* \* \* \*